United States Patent [19]
Lee

[11] Patent Number: 6,122,522
[45] Date of Patent: Sep. 19, 2000

[54] ENHANCED WORST CASE CELL ELIMINATION IN ZONE PAGING WITHIN A CELLULAR COMMUNICATION SYSTEM

[75] Inventor: Hee C. Lee, Plano, Tex.

[73] Assignee: Nortel Networks Corporation, Montreal, Canada

[21] Appl. No.: 09/026,089

[22] Filed: Feb. 19, 1998

[51] Int. Cl.$^7$ ..................................................... H04Q 7/06
[52] U.S. Cl. ............................ 455/458; 455/422; 455/426
[58] Field of Search ..................................... 455/458, 422, 455/426, 432, 434, 436, 446, 453, 456, 466

[56] References Cited

U.S. PATENT DOCUMENTS

| | | | |
|---|---|---|---|
| 5,153,902 | 10/1992 | Buhl et al. | 379/57 |
| 5,369,681 | 11/1994 | Boudreau et al. | 379/87 |
| 5,533,094 | 7/1996 | Sanmugam | 379/57 |
| 5,633,915 | 5/1997 | Yang et al. | 379/60 |
| 5,805,993 | 9/1998 | Cherpantier et al. | 455/422 |
| 5,822,700 | 10/1998 | Hult et al. | 455/466 |
| 5,907,810 | 5/1999 | Subramanian et al. | 455/458 |

*Primary Examiner*—Daniel S. Hunter
*Assistant Examiner*—Pablo Tran
*Attorney, Agent, or Firm*—Bruce E. Garlick; John D. Crane; James A. Harrison

[57] ABSTRACT

A method for reducing the paging load in a cellular communication system is described. The cell C with the largest paging load L is first identified. Since this cell is usually included in more than one paging zone, the paging zones including cell C are identified. Thereafter, cell C is removed tentatively from each identified zone and a ratio R calculated which represents the decrease in loading on cell C due to being removed from zone z divided by the maximum increase in loading on any other cell in the network. The zone for which the ratio R is the largest is the best candidate for removing cell C therefrom. After doing so tentatively, the cell C' with the largest paging load L' thereon is identified. If the loading L is greater than L', cell G is removed permanently from the zone having the highest ratio R therefor and the process is repeated until L' is greater than L at which point the process is stopped without removing cell C from the zone with the highest ratio R. In another operation, cell C, a largest paging load L, and a most favorable zone P from which to remove cell C are first identified. Cell C is then tentatively removed from zone P and the identities of Cell C and zone P stored. Should the removal reduce overall paging load, cell C is removed from zone P. If not, operation continues by identifying new cell C and zone P, performing a tentative removal of cell C from zone P and storing such tentative removal. Such operations continue until the overall paging load decreases, at which point all stored cells C are removed from stored zones P. Should paging load cease to improve until a terminating condition is satisfied, none of the stored cells C are removed and operation ends.

24 Claims, 4 Drawing Sheets

| OPER. | CELL 1 | CELL 2 | CELL 3 | CELL 4 | C | P | W | STACK | W' |
|---|---|---|---|---|---|---|---|---|---|
| OP. 1 | 95 | 93 | 75 | 65 | CELL 1 | ZONE 1 | 95 | | |
| OP. 2 | 85 | 98 | 80 | 70 | | | | C1, Z1 | 98 |
| OP. 3 | 85 | 98 | 80 | 70 | CELL 2 | ZONE 2 | | C1, Z1 | |
| OP. 4 | 90 | 88 | 85 | 75 | | | | C1, Z1 / C2, Z2 | 90 |
| OP. 5 | REMOVE C1 FROM Z1 AND C2 FROM Z2, CLEAR STACK CONTENTS | | | | | | | | |
| OP. 6 | 90 | 88 | 85 | 75 | CELL 1 | ZONE 3 | 90 | | |
| OP. 7 | 80 | 93 | 90 | 80 | | | | C1, Z3 | 93 |
| OP. 8 | 80 | 93 | 90 | 80 | CELL 2 | ZONE 4 | | C1, Z3 | |
| OP. 9 | 85 | 83 | 95 | 85 | | | | C1, Z3 / C2, Z4 | 95 |
| OP. 10 | 85 | 83 | 95 | 85 | CELL 3 | ZONE 5 | | C1, Z3 / C2, Z4 | |
| OP. 11 | 90 | 88 | 85 | 90 | | | | C1, Z3 / C2, Z4 / C3, Z5 | 90 |
| OP. 12 | 90 | 88 | 85 | 90 | CELL 4 | ZONE 6 | | C1, Z3 / C2, Z4 / C3, Z5 | |
| OP. 13 | 95 | 93 | 90 | 80 | | | | C1, Z3 / C2, Z4 / C3, Z5 / C4, Z6 | 95 |

← 400

← 450

ENHANCED WORST CASE CELL ELIMINATION IN ZONE PAGING WITHIN A CELLULAR COMMUNICATION SYSTEM

CROSS-REFERENCE TO RELATED APPLICATION

The present application claims priority pursuant to 35 U.S.C. Sec. 120 to U.S. application Ser. No. 08/743,689, filed Nov. 6, 1996, co-pending and issued on May 25, 1999 as U.S. Pat. No. 5,907,810 which is hereby incorporated herein by reference in its entirety.

BACKGROUND

1. Technical Field

This invention relates broadly to mobile cellular communication systems and in particular, to advanced paging methods for paging subscribers in such a cellular communication system while minimizing the paging load on the system.

2. Related Art

The cellular communications industry has experienced very rapid growth in both the areas serviced and the number of subscribers. It is not uncommon in many metropolitan areas in North America for mobile switching centers to have service requests numbering in excess of 100,000 call attempts per hour. Each such mobile switching center typically services a network of 100 or more cells and keeps track of all mobile telephones currently operating in its service area (SA) via a database commonly referred to as a visitor location register. This register stores information regarding the services available to each subscriber, his home mobile switching center and the current status (e.g., active or inactive) of the mobile telephone.

The mobile switching center, however, does not usually have accurate information regarding the precise geographical location of each of the mobile telephones within the service area. Consequently, when a call is initiated to a mobile telephone believed to be within the service area, a page must be broadcast over the forward control channels (FOCCs), which are also known as the paging and access channels (PACH) to all cells in the service area. When the mobile telephone responds to the page message, the particular cell containing the mobile telephone is then identified from the reverse control channel used for the mobile response and the call is then set up. In the event there is no response to the page, the system assumes that the mobile telephone is currently inactive and the call is treated accordingly.

In view of the fact that each typical mobile switching center in an urban area serves a system with over 100 cells, in order to broadcast a page message over the forward control channels of all the cells in such a typical system, the paging message must be replicated a corresponding number of times and sent to each cell. As only one cell in the system can respond, this means that a large number of these paging messages are not required as they will result in no reply whatsoever. These unneeded paging messages are produced at the expense of the mobile switching center being available for performing another task. Hence, the overall system performance is degraded by the overhead caused by the generation of unneeded paging messages.

Various approaches have been suggested for overcoming this problem. In one such approach, the cellular system is partitioned into location areas which are smaller than the service area covered by the mobile switching center. Every time a mobile telephone leaves a location area and enters another location area it registers a location update that indicates the mobile telephone is a visitor in the area from which the mobile telephone is registered. As a result, should a call be initiated to that mobile telephone, the paging message needs to be sent only to the cells in the location area where the mobile telephone is "visiting" thereby dramatically reducing system loading associated with paging that particular mobile telephone. However, this approach does increase the number of registration activities as registration occurs each time an active mobile telephone moves from one location area to another which will occur more frequently than would be required in systems where registration occurs only when a mobile telephone is moved from one service area to another.

A variant of the above described paging approach is known as zone paging. In this approach, a two dimensional array is developed known as a Location Accuracy Matrix (LAM). Each entry (i,j) contains the number of page responses received from subscribers in cell j when the last known location of the subscriber was in cell i. The LAM data is then used to develop a probability matrix (p(i,j)) which is the probability that a subscriber is in cell j given the fact that its last known location was in cell i. The zone used for paging a subscriber whose last known location was in cell i is all the cells j for which the probability $p(i,j)>0.001$. In the event that this selective zone page is unsuccessful, then all cells in the service area are paged in an attempt to locate the subscriber. If the all zone page is unsuccessful, the subscriber is assumed to have his or her mobile phone turned off.

Further attempts to reduce overall paging have proved somewhat successful. A more optimal approach has been developed where the inclusion of a cell j into a given zone $Z(i)$ is based on whether inclusion of cell j increases or decreases the overall paging rather than on a single cut-off point of 0.001. This more optimal approach is accomplished by first determining the probability p(i,j) that a subscriber is in cell j given that its last known location was cell i and arrange these probabilities p(i,j) for all j in decreasing order and let the cells with decreasing probabilities be cells $j_1$, $j_2, \ldots j_n$. Next the zone $Z(i)$ is initialized to contain no cells. For each k from 1 to n, include the cell $j_k$ in the zone if zone $j_{k-1}$ is in the zone and the following inequality is true:

$$k+(1-(p(i,j_1)+p(i,j_2)+ \ldots +p(i,j_k)))*n<=k-1+(1-(p(i,j_1)+p(i,j_2)+ \ldots +p(i,j_{k-1})))*n$$

The process is stopped when a value of k is reached where the inequality fails. The more optimal zone $Z(i)$ then consists of the cells $j_1, j_2, j_3, \ldots j_{k-1}$. This more optimal approach does reduce paging compared to the earlier described zone paging approach, however, it does still leave considerable paging in the worst-case cell. The higher paging in the worst-case cell is due to the previously unrecognized consequence of having such worst-case cell in more than one zone.

However, such techniques of creating zones for zone paging often result in over-burdening of some of the cells. Such over-burdening causes same of similar drawbacks and problems as were previously caused. Thus, such prior techniques often failed as well to enhance operation in all cells of the network.

OBJECT OF THE INVENTION

In view of the above outlined difficulties with known paging approaches for cellular phone systems, it is a primary objective of the present invention to provide a cellular telephone system which has reduced worst-case cell paging compared to earlier designs.

SUMMARY OF THE INVENTION

This invention relates to a cellular phone system in which worst case paging is minimized. The system records the location of all the mobile phones served by the system each time the phone is paged by the system. This data, in combination with the data indicating the previously last known servicing cell for each mobile station served by the system, is utilized to develop probabilities $P(i,j)$ which comprises the probability that any mobile is in cell j when it was last known to be in cell i. The probabilities $P(i,j)$ are then ordered from largest to smallest. Then, zones $Z(i)$ are developed which define the cells that will be paged first based on the last known cell i where a given mobile was located. A particular cell k is included in the zone $Z(i)$ if the following inequality is true for each value of k from 1 to n:

$$k+(1-(P(i,j_1)+P(i,j_2)+\ldots+P(i,j_k)))*n <= k-1+(1-(P(i,j_1)+P(i,j_2)+\ldots+P(i,j_{k-1})))*n.$$

Once the zones have been established by this process, then the overall paging load is determined due to the inclusion of each cell in more than one zone. In this iterative process, high traffic cells are removed from zones where the benefit of having them is minimal. This process will result in a somewhat increased overall paging load on the system but reduces the worst-case cell paging dramatically.

Moreover, other aspects of the present invention will become apparent with further reference to the drawings and specification which follow.

BRIEF DESCRIPTION OF THE DRAWINGS

The above mentioned objects, advantages and features of the present invention are described below in connection with the drawings which form a part of the disclosure wherein.

DETAILED DESCRIPTION OF THE DRAWINGS

This invention provides a mechanism, within a cellular telephone network, to reduce the worst-case cell paging within the system. Paging is a process for locating a mobile station within a mobile network. In the normal operation of a mobile system, each time a mobile station is turned on, it registers with the mobile system. Registration serves to locate the mobile station as being within the service area of a given cell of the system. Since mobile stations are most frequently carried by subscribers who are traveling from one location to another, the mobile station may not remain within the cell in which it most recently registered. This means that if a call for the mobile station were directed solely to the cell where the mobile last registered, the call may not be completed in a very large number of cases.

One approach to overcoming this problem is to have mobiles re-register periodically. This approach, however, increases the system overhead and decreases the utilization of the cellular system. Hence, re-registration is not done frequently and typically occurs at a rate of once every 15 or 20 minutes. This means that there is ample time for a mobile station to be moved from the cell where registration last occurred to another cell.

When a call is to be directed to a given mobile station, a paging signal is sent out requesting that the mobile station respond. This is required because there is no feasible way to know exactly what cell service area the mobile is located in. Paging all cells in the network, however, is undesirable because the mobile can be serviced by only one cell and paging at all cells increases the paging level on the system and reduces its overall efficiency. Therefore, zone paging has become the preferred approach to reducing the overall paging load. The concept here is to define zones of cells which are paged first when looking for a particular mobile before paging the whole system. The zones are selected to be the cells in which the mobile is most likely to be in given the fact that the last known location of the mobile was in the service area served by a given cell.

Figure 1:
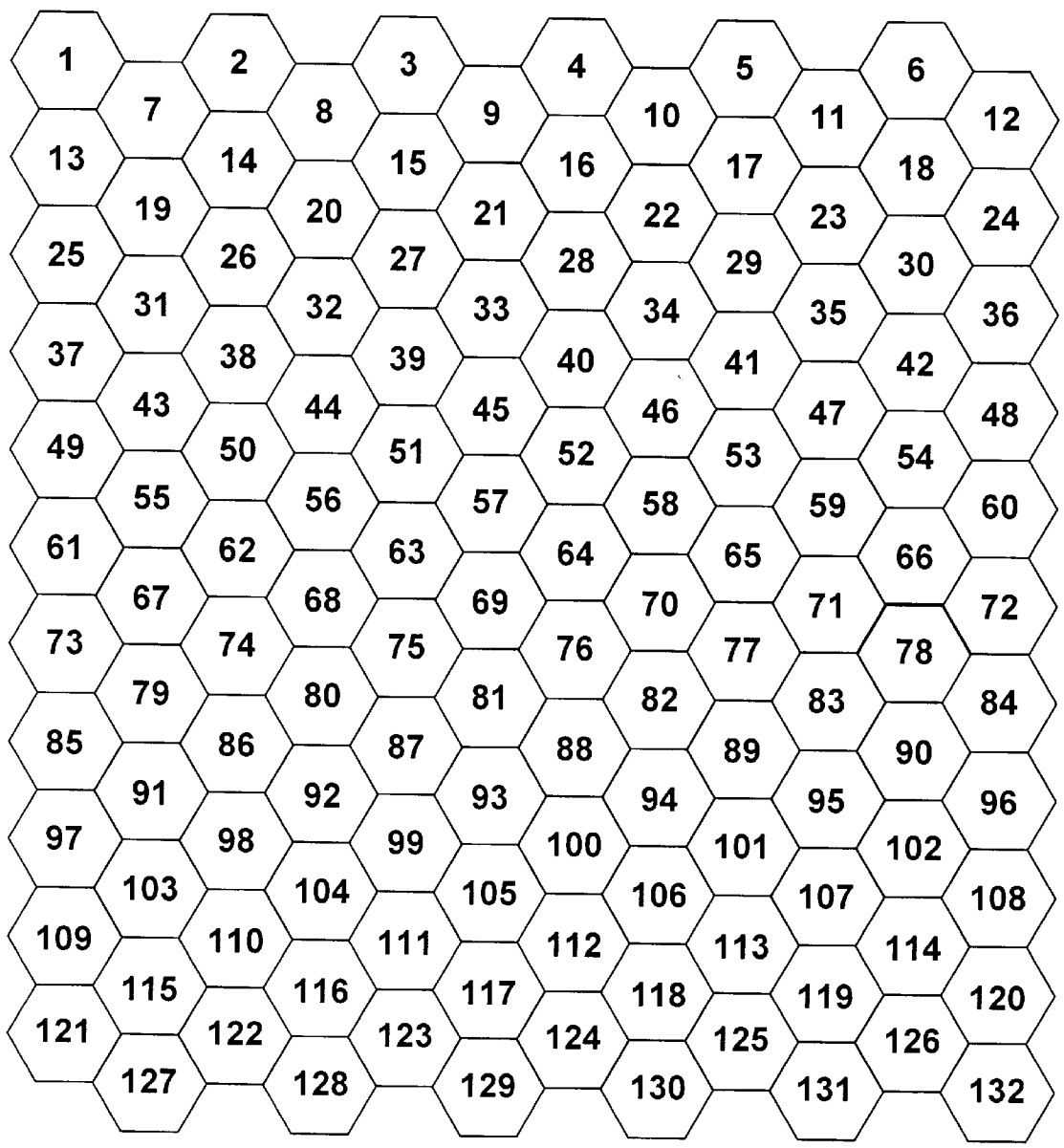
FIG. 1 schematically illustrates a cellular network with a plurality of cells therein.

This is illustrated by FIG. 1 which includes a plurality of adjacent hexagons with a number therein. Each hexagon is representative of the geographic area served by a given cell identified by the number included therein. Let us assume that a given mobile station was turned on while physically located in the geographic area served by cell 45. One can readily imagine that the mobile may have moved to any of the cells immediately adjacent thereto before the mobile will be asked by the system to register again. Therefore, one could easily understand that if a zone were established containing cells 45, 33, 39, 40, 51, 52 and 57, there would be a higher probability that a paging signal for that mobile station will be responded to if all the cells in this zone issued the paging signal. In actual practice today, however, zones are established in a much more scientific manner than simply including the cells adjacent the cell in which the mobile was last known to be located. One such approach is described below although other approaches may be employed.

As mentioned above, this invention relates to reducing the worst case paging. This relates to the fact that when a network operator defines zones for paging irrespective of the specific approach, selected cells will appear in more than one zone. This means that any paging in any zone containing that cell will occur within that cell. Thus, some cells are likely to experience a great deal of paging activity due to the fact that they are included in many zones. This can be visualized in FIG. 1 by considering the zone defined above and a second zone including cells 52, 40, 45, 46, 57, 58, and 64. Cells 40, 45, 52 and 57 appear in each of these zones and a page in either zone will affect these cells. In a more complex zone configuration, some cells may have dramatically increased paging load giving rise to some cells in which the paging load is very high indeed.

One approach for defining the zones for a zone paging scheme is described below. First, statistics are kept over an extended period of time such as a week or longer period of time. During that time, records are kept as to the last known cell for each mobile telephone as well as the next identified cell in which the location of the same mobile telephone is subsequently identified. Once this data is collected, then (1) the probability $P(i,j)$ is calculated for every cell in the network. $P(i,j)$ is the probability that a mobile telephone, previously located in cell i, will next be located in cell j. Thereafter, all the probabilities $P(i,j)$ are ordered from largest to smallest for each cell i and the list of cells of decreasing probabilities is $\{j_1, j_2, \ldots, j_n\}$ where n is the number of cells in the system. (2) The zone Z(i) is then initialized to contain a null set. (3) For each k from 1 through n, include the cell $j_k$ in the zone if $j_{k-1}$ is in the zone and the following inequality is true:

$$k+(1-(P(i,j_1)+p(i,j_2)+ \ldots +p(i,j_k)))*n<=k-1+(1-(P(i,j_1)+p(i,j_2)+ \ldots +p(i,j_{k-1})))*n$$

(4) This process is repeated until a value for k is determined where the above equation is not true. Then the zone Z(i) consists of the cells $\{j_1, j_2, \ldots, J_{k-1}\}$.

The optimized zone definition produced by using steps (1)–(4) above is but one approach for defining zones in a zone paging system. Other known or new methods of defining the zones may also be utilized in connection with this invention. Regardless of the approach utilized to define the cells in each zone, many cells will be included in multiple zones. When this occurs, the loading on those cells due to paging may become quite considerable. Therefore, the present invention is directed to reducing this paging load on the cells with the worst paging load.

Figure 2:
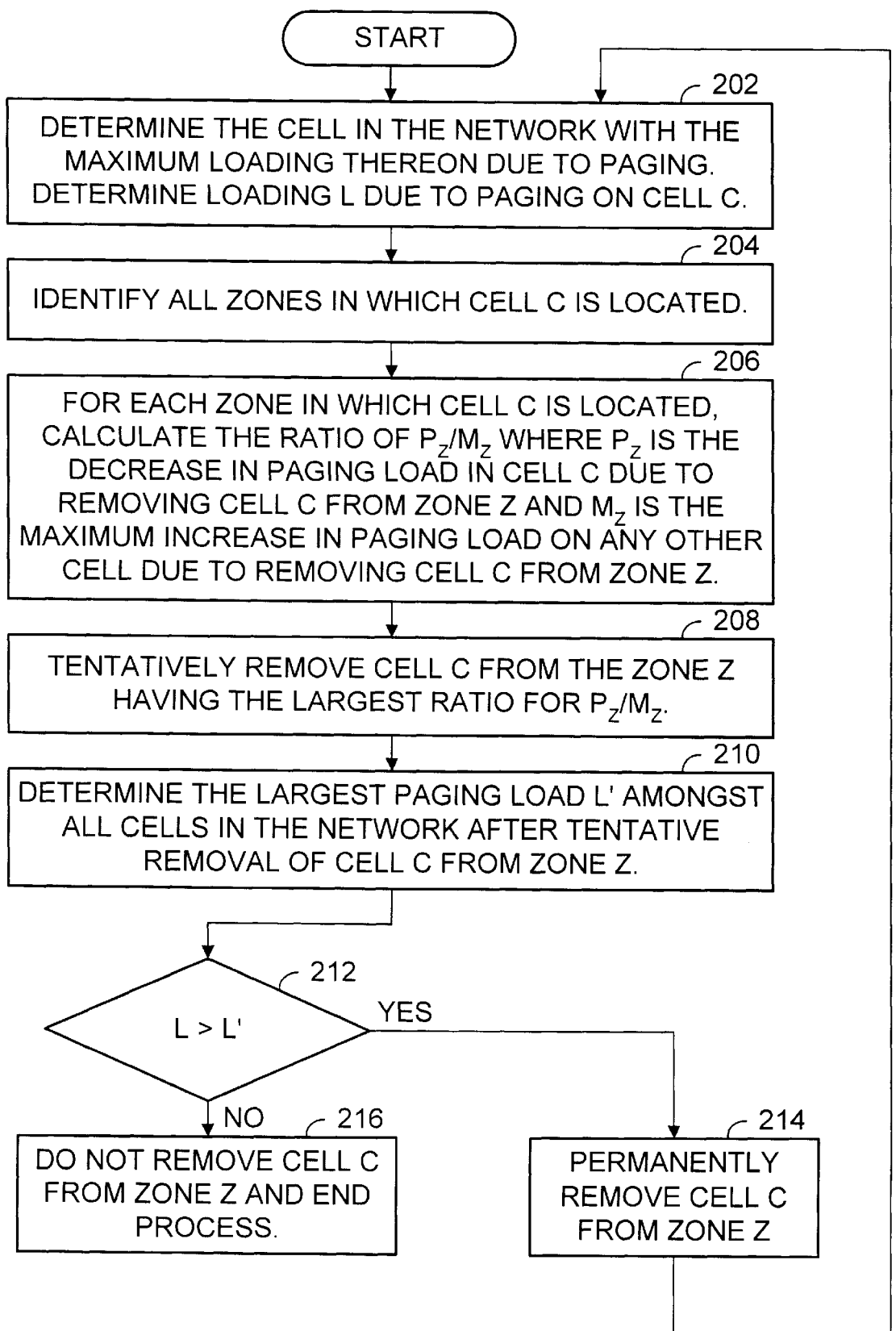
FIG. 2 is a flow chart which illustrates the method of the present invention.

The approach of this invention is to identify a bottleneck call C, the cell which receives the highest paging traffic in the network. Then the zones which include cell C are identified. For each of the zones, the paging traffic is recalculated assuming the cell C has been removed one zone at a time. Then $p_z$ is calculated which is the percentage reduction in the paging traffic in cell C if cell C is removed from zone Z. Next, $m_z$ is calculated which is the maximum increase in paging load on any other cell in the entire network as a result of C being removed from zone Z. Thereafter, the ratio of $p_z/m_z$ is calculated. Once all of these ratios have been calculated, the zone for which the ratio is the largest is the candidate for having cell C removed therefrom. The decision to actually remove cell C from the zone Z for which the ratio $p_z/m_z$ is a maximum is made as follows. The paging load L on the cell C is calculated prior to its removal from zone Z. Then, the largest paging load L' is identified amongst all the cells in the network after the proposed removal of cell C from zone Z. If load L is greater than load L', then cell C should be removed from zone Z as the remaining worst case loading L' caused by paging after removal of cell C is smaller than the worst case loading L was prior to removal of cell C. This approach is illustrated in FIG. 2.

As noted above, the first objective is to identify the bottleneck cell C at step 202. This is done by identifying the specific cell C which has the maximum paging load defined herein as the largest paging load pg(x) over all cells x in the network. One method for determining the cell C with the maximum paging load is to determine which cell x has the highest probability of all cells in the network of being paged. For each cell x in the network, the probability pg(x) that cell x will be paged is calculated using the following equation:

$$pg(x) = \sum_{Z(i) \in CZ(x)} I_i + \sum_{Z(i) \in NC(Z(x))} I_i(1 - P(Z(i))r) \qquad \text{(eq. 1)}$$

where:

$I_i$ is the probability that the last known cell of mobile m is i;

CZ(x) is the set of zones containing the cell x;

NC(Z(x)) is all other zones;

r is the probability that the mobile will respond given it is in zone Z(i); and

P(Z(i)) is the probability that the mobile m is in zone Z(i) given the last known location of mobile m is cell i. This is calculated as shown in eq. 2.

$$PZ(i) = \sum_{j \in Z(i)} P(i,j) \qquad \text{(eq. 2)}$$

Alternative methods are available for determining the bottleneck cell C. They include other statistically determined approaches as well as actual measurement of which cell receives the largest paging load in the network. Any such approach may be utilized in the present invention to identify the bottleneck cell.

Once the bottleneck cell C has been identified at step 202, all zones containing cell C are identified at step 204. Then the specific zone containing cell C from which cell C is to be removed must be determined at step 206. This is done conceptually by determining the reduction in the paging load on cell C due to its removal from each of the zones Z containing cell C (quantity $p_z$) divided by the maximum increase of paging load on any other cell in the network due to removal of cell C from that zone Z (quantity $m_z$). The zone Z for which this ratio ($p_z/m_z$) is the largest is the zone from which cell C should be conditionally removed. The quantities $p_z$ and $m_z$ are calculated using equations 3 and 4.

$$p_z = I_i - I_i(1-[P(Z(i))-P(i,x)]r) \qquad \text{(eq. 3)}$$

$$m_z = I_i(P(i,x)r) \qquad \text{(eq. 4)}$$

where P(i,x) is the probability that the mobile m is located in cell x given that it was last known to be in cell I. The actual form of the equations used will depend on the type of paging involved. For the example illustrated here, the paging mechanism involves selecting a zone containing a plurality of cells which are first paged when a call is placed for a given mobile telephone. The zone is determined based on the last known cell for the mobile being paged. In the event that the mobile telephone being sought is not located within the zone paged as evidenced by the fact that it did not respond to the page in the zone, all remaining cells are paged to determine if the mobile telephone being sought is within the area served by the remaining cells in the network.

Once the zone is defined with the maximum ratio of $p_z/m_z$, the bottleneck cell C is tentatively removed from that zone at step 208. Next, the largest paging load pg(y) for all cells is then calculated again for the newly defined zones at step 210. If the largest newly calculated paging load pg(y) is smaller than the largest paging load pg(x) calculated before tentatively removing the bottleneck cell from the zone with the maximum ratio $p_z/m_z$ at step 212, the bottleneck cell is permanently removed from the zone at step 214 and the process is repeated from step 202 until removing a bottleneck cell causes an increase in the paging load on the remaining worst case cell at step 212. If such occurs, cell C is not removed from the identified zone and the process ends.

Figure 3:
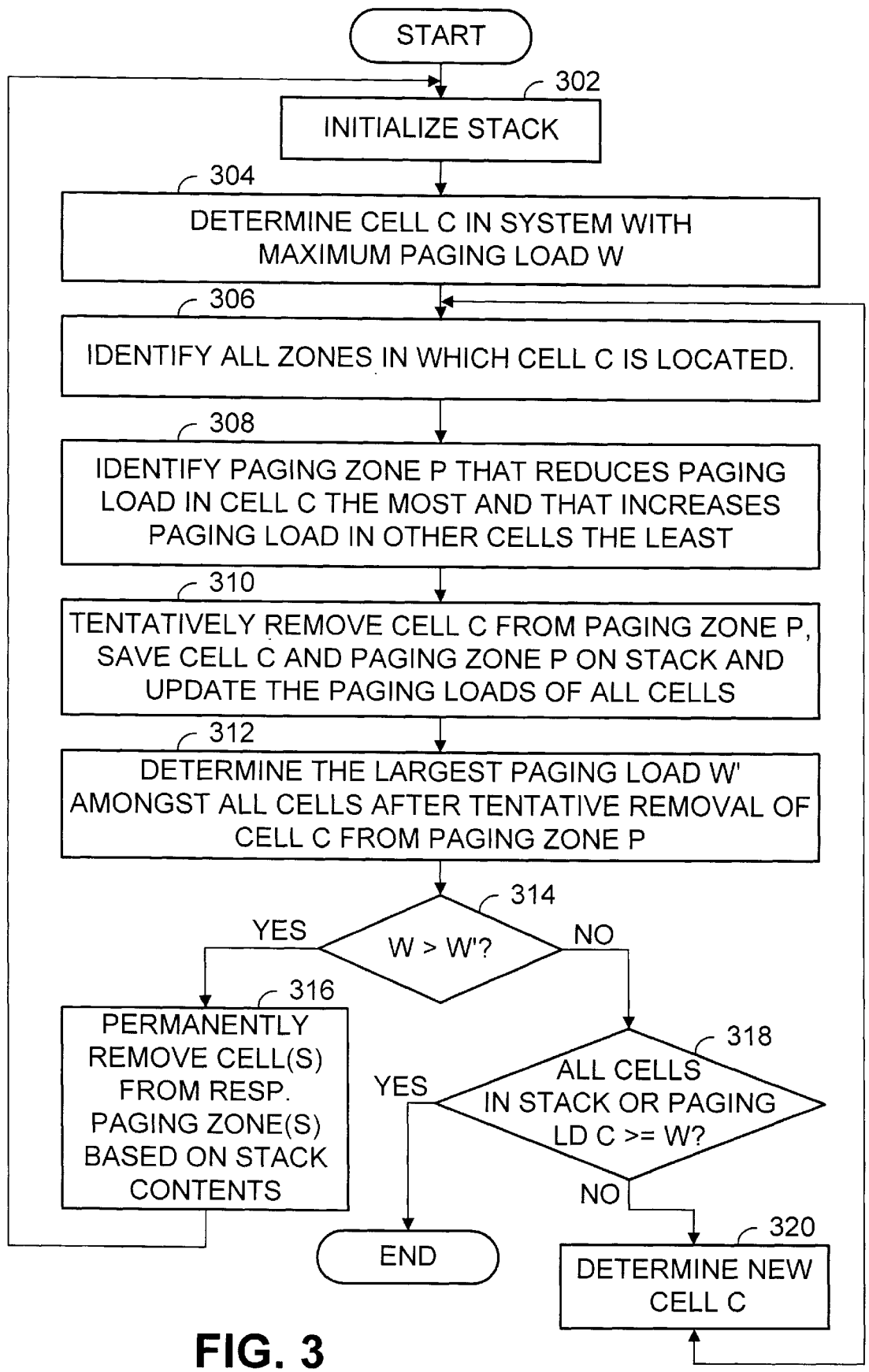
FIG. 3 is a flow chart which illustrates an alternative method of the present invention.

FIG. 3 illustrates another approaching in reducing the paging load. As compared to the operation of FIG. 2, the operation of FIG. 3 performs a series of prospective operations, continues operation based upon the prospective operations and permanently removes cells from zones only when the prospective operations as a whole prove useful. Operation continues again after permanent removals but again investigates a series of tentative removals. Additional permanent removals may be made thereafter iteratively before operation ends.

A stack is used to store the tentative removal of cells from zones during operation. Thus at step 302, the stack is initialized to an empty state. Then, at step 304 the bottleneck cell C with maximum paging load is determined. The paging load on cell C is denoted as W and is the largest paging load pg(x) over all cells x in the network. Equations 1 and 2 may be used to determine the cell C with the maximum paging load W. Alternative methods are also available for determining the bottleneck cell C. They include other statistically determined approaches as well as actual measurement of which cell receives the largest paging load in the network. Any such approach may be utilized in the present invention to identify the bottleneck cell.

Once the bottleneck cell C has been identified and all zones of which it is a member identified at steps 304 and 306, the specific zone containing cell C from which cell C will be tentatively removed is determined at step 308. The zone selected, P, is determined such that removal of cell C from zone P reduces paging load in cell C the most and that increases paging load in all other cells the least. This is done conceptually by determining the reduction in the paging load on cell C due to its removal from each of the zones containing cell x (quantity $p_z$) divided by the maximum increase of paging load on any other cell in the network due to removal of cell x from that zone (quantity $m_z$). The zone P for which this ratio ($p_z/m_z$) is the largest is the zone from which cell x should be conditionally removed. The quantities $p_z$ and $m_z$ may be calculated by using eq. 3 and eq. 4. The actual form of the equations used will depend on the type of paging involved.

Once the zone P is identified at step 308, the bottleneck cell C is tentatively removed from zone P and the identities of cell C and zone P are pushed onto the stack at step 310. Next, the largest paging load W' for all cells is then calculated again for the newly defined zones at step 312. W' is calculated as the largest calculated paging load pg(y) for all y with cell C having been removed from zone P. Next, at step 314, it is determined whether the previously calculated largest paging load W is greater than the newly calculated largest paging load W'. If so, operation proceeds to step 316 where the stack contents are employed to remove at least one bottleneck cell from at least one respectively determined zone. As previously indicated, upon execution of step 310, cell C is tentatively removed from zone Z. Step 310 may be executed a number of times before, and if, step 316 is reached. Thus, at step 316, at least one bottleneck cell is removed from a previously determined zone based upon the contents of the stack.

If at step 314 it is determined that W is not greater than W', operation proceeds to step 318 where it is determined if either (1) all cells within the network are present in the stack or (2) the updated paging load on cell C is greater than or equal to W, the maximum paging load in the network as determined at step 304. If the determination at step 318 is yes, operation ends. However, if the determination is no at step 318, a new cell C is determined at step 318 and operation proceeds again to step 306. Note that the maximum paging load W is maintained at this point in the operation even though All of the above equations are useful in a paging scheme where a given mobile m is first paged in the zone Z(i) where i is the last known cell location of the mobile m. Then, assuming the mobile m does not respond to the first paging request, all other cells not contained in zone Z(i) are paged to attempt to contact mobile m. In the event other paging approaches are utilized, the specific approach to measuring paging load, the decrease in paging load due to removing a cell from a zone and the maximum increase in paging load on all other cells may be calculated in a different manner than that described above. However, these approaches will work in accordance with the present invention to reduce the overall network load due to paging.

Figures 4A, 4B:
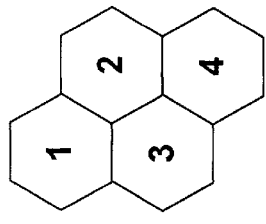
FIGS. 4A and 4B are diagrams illustrating a simplified multicell network within which the method illustrated in FIG. 3 operates and intermediate and final results obtained therein during an example of operation according to the present invention.

FIGS. 4A and 4B illustrate a four cell network 400 and results of operation 450 according to FIG. 3 thereupon. As is shown in FIG. 4A, the four cell network 400 includes cell 1, cell 2, cell 3 and cell 4. FIG. 4B illustrates the intermediate and final results obtained from execution of the operation of the method illustrated in FIG. 3. In executing the operation, it is assumed that removing any cell from a particular zone reduces paging load in the removed cell by 10 while increasing the paging load in every other cell by 5.

Initially, as shown for OP. 1, paging load on cells 1 through 4 is 95, 93, 75 and 65, respectively. The stack is initialized at step 302 and then, upon execution of step 304 it is determined that cell 1 has the maximum paging load of 95 and W is set to 95. It is then determined at steps 306 and 308 that cell 1 will be tentatively removed from zone 1. As shown for OP. 2, cell 1 is then tentatively removed from zone 1 and updated paging loads are determined to be 85, 98, 80 and 70 for cells 1 through 4, respectively. Cell 1/zone 1 are then pushed onto the stack and W' is determined to be 98 at step 312. Since W of 95 is not greater than W' of 98, operation then proceeds from step 314 to step 318. Then, since all cells are not represented on the stack and the paging load on cell 1 of 85 is not greater than or equal to W of 95, operation proceeds to step 320.

At step 320, as shown for OP. 3, cell 2 is determined to be the cell with the maximum paging load and operation then proceeds through steps 306 and 308 where it is determined that cell 2 should be removed from zone 2. Then, as shown for OP. 4, at step 310 cell 2 is tentatively removed from zone 2 and the paging loads are updated to be 90, 88, 85 and 75 for cells 1 through 4, respectively. Cell 2/zone 2 are then pushed onto the stack and W' is calculated to be 90 at step 312. Since W of 95 is now greater than W' of 90, operation proceeds from step 314 to step 316 where, as illustrated for OP. 5, based upon the contents of the stack, cell 1 is permanently removed from zone 1 and cell 2 is permanently removed from zone 2. Then, operation proceeds to step 302 wherein the stack is again initialized to an empty state.

Next, as shown for OP. 6, operation proceeds through steps 304, 306 and 308 where it is determined that cell 1 should be removed from zone 3 and W is calculated to be 90. Then, as shown for OP. 7 at step 310, cell 1 is tentatively removed from zone 3 and the paging loads are updated to be 80, 93, 90 and 80 for cells 1 through 4, respectively. Cell 1/zone 3 are then pushed onto the stack and W' is calculated to be 93 at step 312. Since W of 90 is not greater than W' of 93, operation proceeds from step 314 to step 318. Then, since all cells are not represented on the stack and the paging load on cell 1 of 80 is not greater than or equal to W of 90, operation proceeds to step 320.

At step 320, and as shown for OP. 8, cell 2 is determined to be the cell with the maximum paging load. Operation then proceeds through steps 306 and 308 where it is determined that cell 2 should be removed from zone 4. Then, as shown for OP. 9, at step 310 cell 2 is tentatively removed from zone 4 and the paging loads are updated to be 85, 83, 95 and 85 for cells 1 through 4, respectively. Cell 2/zone 4 are then pushed onto the stack and W' is then calculated to be 95 at step 312. Since W of 90 is not greater than W' of 95, operation proceeds from step 314 to step 318. Then, since all cells are not represented on the stack and the paging load on cell 2 of 83 is not greater than or equal to W of 90, operation proceeds to step 320.

At step 320, and as shown for OP. 10, cell 3 is determined to be the cell with the maximum paging load. Operation then proceeds through steps 306 and 308 where it is determined that cell 3 should be removed from zone 5. Then, as shown for OP. 11 at step 310, cell 3 is tentatively removed from zone 5 and the paging loads are updated to be 90, 88, 85 and 90 for cells 1 through 4, respectively. Cell 3/zone 5 are then pushed onto the stack and W' is then calculated to be 90 at step 312. Since W of 90 is not greater than W' of 90, operation proceeds from step 314 to step 318. Then, since all cells are not represented on the stack and the paging load on cell 3 of 85 is not greater than or equal to W of 90, operation proceeds to step 320.

At step 320, and as shown for OP. 12, cell 4 is determined to be the cell with the maximum paging load. Operation then proceeds through steps 306 and 308 where it is determined that cell 4 should be removed from zone 6. Then, as shown for OP. 13 at step 310, cell 4 is tentatively removed from zone 6 and the paging loads are updated to be 95, 93, 90 and 80 for cells 1 through 4, respectively. Cell 4/zone 6 are then pushed onto the stack and W' is then calculated to be 95 at step 312. Since W of 90 is not greater than W' of 95, operation proceeds from step 314 to step 318. Then, at step 318, because each cells 1 through 4 is in the stack, operation ends. Based upon the operation according to the present invention, none of the tentative moves represented upon the stack are executed and paging load on the network 400 corresponds to OP. 5.

While the above mentioned objects, advantages and features of the present invention have been described in connection with the preferred approach, those of skill in the art will readily recognize that the alternative approaches mentioned above and other similar approaches may be utilized without departing from the spirit and scope of the present invention as defined in the following claims.

What is claimed is:

1. A method for minimizing the paging load in a multicell wireless telephone network comprising the steps of:
    (a) determining a cell C in the cellular telephone network having a maximum paging load W thereon;
    (b) identifying zones in which cell C is located;
    (c) of the zones in which cell C is located, determining a zone P that reduces paging load in cell C the most and that increases the paging load in other cells of the network the least;
    (d) tentatively removing cell C from zone P and storing the identity of removed cell C in conjunction with zone P;
    (e) determining a maximum paging load W' based upon all previous tentative cell removals included;
    (f) when W exceeds W', permanently executing all tentative cell removals and repeating steps (a) through (e); and
    (g) when W does not exceed W', selecting a new cell C with a maximum paging load thereon based upon all previous tentative cell removals and repeating steps (b) through (f).

2. The method of claim 1, further comprising the step of exiting the process when the paging load on cell C is at least as large as W or when each cells in the network has been removed from at least one zone.

3. The method of claim 1, wherein the paging load on each cell due to paging is determined by counting the number of pages occurring in each cell in the network during a given time period.

4. The method of claim 1, wherein the paging load on each cell due to paging is determined using the equation:

$$pg(x) = \sum_{Z(i) \in CZ(x)} I_i + \sum_{Z(i) \in NC(Z(x))} I_i(1 - P(Z(i))r)$$

where:

$I_i$ is the probability that the last known cell of mobile m is i;

$CZ(x)$ is the set of zones containing the cell x;

$NC(Z(x))$ is all other zones;

r is the probability that the mobile will respond given it is in zone Z(i); and

P(Z(i)) is the probability that the mobile m is in zone Z(i) given the last known location of mobile m is in cell i contained in zone Z(i).

5. The method of claim 1, wherein determining the zone P that reduces paging load in cell C the most and that increases the paging load in other cells of the network the least includes maximizing the ratio of the decreased paging load on cell C ($p_z$) divided by the maximum increase in paging load on any other network cell ($m_z$).

6. The method of claim 5, wherein $p_z$ is calculated using the equation:

$$P_z = I_i - I_i(1 - [P(Z(i)) - P(i,x)]r)$$

where:

$I_i$ is the probability that the last known cell of mobile m is i;

P(Z(i)) is the probability that the mobile m is in zone Z(i) given the last known location of mobile m is cell i contained in Z(i); and P(i,x) is the probability that the mobile will be in cell x given the last known location was cell i.

7. The method of claim 6, wherein $p_z$ is calculated using the equation:

$$m_z = I_i(P(i,x)r)$$

where:

$I_i$ is the probability that the last known cell of mobile m is i;

r is the probability that the mobile will respond given it is in zone Z(i); and

P(i,x) is the probability that the mobile will be in cell x given the last known location was cell i.

8. The method of claim 5, wherein $p_z$ is calculated using the equation:

$$m_z = I_i(P(i,x)r)$$

where:

$I_i$ is the probability that the last known cell of mobile m is i;

r is the probability that the mobile will respond given it is in zone Z(i); and

P(i,x) is the probability that the mobile will be in cell x given the last known location was cell i.

9. The method of claim 5, wherein the paging load on each cell due to paging is determined using the equation:

$$pg(x) = \sum_{Z(i) \in CZ(x)} I_i + \sum_{Z(i) \in NC(Z(x))} I_i(1 - P(Z(i))r)$$

where:
   $I_i$ is the probability that the last known cell of mobile m is i;
   $CZ(x)$ is the set of zones containing the cell x;
   $NC(Z(x))$ is all other zones;
   r is the probability that the mobile will respond given it is in zone $Z(i)$; and
   $P(Z(i))$ is the probability that the mobile m is in zone $Z(i)$ given the last known location of mobile m is in cell i contained in zone $Z(i)$.

10. The method of claim 9, wherein $p_z$ is calculated using the equation:

$$p_z = I_i - I_i(1 - [P(Z(i)) - P(i,x)]r)$$

where:
   $I_i$ is the probability that the last known cell of mobile m is i;
   $P(Z(i))$ is the probability that the mobile m is in zone $Z(i)$ given the last known location of mobile m is cell i contained in $Z(i)$; and
   $P(i,x)$ is the probability that the mobile will be in cell x given the last known location was cell i.

11. The method of claim 10, wherein $m_z$ is calculated using the equation:

$$m_z = I_i(P(i,x)r)$$

where:
   $I_i$ is the probability that the last known cell of mobile m is i;
   r is the probability that the mobile will respond given it is in zone $Z(i)$; and
   $P(i,x)$ is the probability that the mobile will be in cell x given the last known location was cell i.

12. The method of claim 9, wherein $m_z$ is calculated using the equation:

$$m_z = I_i(P(i,x)r)$$

where:
   $I_i$ is the probability that the last known cell of mobile m is i;
   r is the probability that the mobile will respond given it is in zone $Z(i)$; and
   $P(i,x)$ is the probability that the mobile will be in cell x given the last known location was cell i.

13. A method for minimizing the paging load in a multicell wireless telephone network comprising the steps of:
   (a) determining the probability $P(i,j)$, for all cells in the network that a given mobile is in cell j given the fact that its last known position was zone i and order the list of probabilities $P(i,j)$ from largest to smallest;
   (b) defining a plurality of paging zones $Z(i)$ for each cell i in the network, each particular cell k being included in the zone $Z(i)$ if the following inequality is true:

$$k + (1 - (P(i,j) + P(i,j_2) + \ldots + P(i,j_k)))*n <= k - 1 + (1 - (P(i,j_1) + P(i,j_2) + \ldots + P(i,j_{k-1})))*n$$

and the order of successive probabilities used in the inequality is defined by said ordered list of probabilities $P(i,j)$;

(c) determining a cell C in the cellular telephone network having a maximum paging load W thereon;
   (d) identifying zones in which cell C is located;
   (e) of the zones in which cell C is located, determining a zone P that reduces paging load in cell C the most and that increases the paging load in other cells of the network the least;
   (f) tentatively removing cell C from zone P and storing the identity of removed cell C in conjunction with zone P;
   (g) determining a maximum paging load W' based upon all previous tentative cell removals included;
   (h) when W exceeds W', permanently executing all tentative cell removals and repeating steps (c) through (g); and
   (i) when W does not exceed W', selecting a new cell C with a maximum paging load thereon based upon all previous tentative cell removals and repeating steps (d) through (h).

14. The method of claim 13, further comprising the step of exiting the process when the paging load on cell C is at least as large as W or when each cells in the network ha been removed from at least one zone.

15. The method of claim 13, wherein the paging load on each cell due to paging is determined by counting the number of pages occurring in each cell in the network during a given time period.

16. The method of claim 13, wherein the paging load on each cell due to paging is determined using the equation:

$$pg(x) = \sum_{Z(i) \in CZ(x)} I_i + \sum_{Z(i) \in NC(Z(x))} I_i(1 - P(Z(i))r)$$

where:
   $I_i$ is the probability that the last known cell of mobile m is i;
   $CZ(x)$ is the set of zones containing the cell x;
   $NC(Z(x))$ is all other zones;
   r is the probability that the mobile will respond given it is in zone $Z(i)$; and
   $P(Z(i))$ is the probability that the mobile m is in zone $Z(i)$ given the last known location of mobile m is in cell i contained in zone $Z(i)$.

17. The method of claim 13, wherein determining the zone P that reduces paging load in cell C the most and that increases the paging load in other cells of the network the least includes maximizing the ratio of the decreased paging load on cell C ($p_z$) divided by the maximum increase in paging load on any other network cell ($m_z$).

18. The method of claim 17, wherein $p_z$ is calculated using the equation:

$$p_z = I_i - I_i(1 - [P(Z(i)) - P(i,x)]r)$$

where:
   $I_i$ is the probability that the last known cell of mobile m is i;
   $P(Z(i))$ is the probability that the mobile m is in zone $Z(i)$ given the last known location of mobile m is cell i contained in $Z(i)$; and
   $P(i,x)$ is the probability that the mobile will be in cell x given the last known location was cell i.

19. The method of claim 18, wherein $p_z$ is calculated using the equation:

$$m_z = I_i(P(i,x)r)$$

where:

$I_i$ is the probability that the last known cell of mobile m is i;

r is the probability that the mobile will respond given it is in zone Z(i); and

P(i,x) is the probability that the mobile will be in cell x given the last known location was cell i.

20. The method of claim 17, wherein $p_z$ is calculated using the equation:

$$m_z = I_i(P(i,x)r)$$

where:

$I_i$ is the probability that the last known cell of mobile m is i;

r is the probability that the mobile will respond given it is in zone Z(i); and

P(i,x) is the probability that the mobile will be in cell x given the last known location was cell i.

21. The method of claim 17, wherein the paging load on each cell due to paging is determined using the equation:

$$pg(x) = \sum_{Z(i) \in CZ(x)} I_i + \sum_{Z(i) \in NC(Z(x))} I_i(1 - P(Z(i))r)$$

where:

$I_i$ is the probability that the last known cell of mobile m is i;

CZ(x) is the set of zones containing the cell x;

NC(Z(x)) is all other zones;

r is the probability that the mobile will respond given it is in zone Z(i); and

P(Z(i)) is the probability that the mobile m is in zone Z(i) given the last known location of mobile m is in cell i contained in zone Z(i).

22. The method of claim 21, wherein $p_z$ is calculated using the equation:

$$p_z = I_i - I_i(1 - [P(Z(i)) - P(i,x)]r)$$

where:

$I_i$ is the probability that the last known cell of mobile m is i;

P(Z(i)) is the probability that the mobile m is in zone Z(i) given the last known location of mobile m is cell i contained in Z(i); and P(i,x) is the probability that the mobile will be in cell x given the last known location was cell i.

23. The method of claim 22, wherein $m_z$ is calculated using the equation:

$$m_z = I_i(P(i,x)r)$$

where:

$I_i$ is the probability that the last known cell of mobile m is i;

r is the probability that the mobile will respond given it is in zone Z(i); and

P(i,x) is the probability that the mobile will be in cell x given the last known location was cell i.

24. The method of claim 21, wherein $m_z$ is calculated using the equation:

$$m_z = I_i(P(i,x)r)$$

where:

$I_i$ is the probability that the last known cell of mobile m is i;

r is the probability that the mobile will respond given it is in zone Z(i); and

P(i,x) is the probability that the mobile will be in cell x given the last known location was cell i.

* * * * *